United States Patent
Yamaguchi

(10) Patent No.: US 7,839,924 B2
(45) Date of Patent: Nov. 23, 2010

(54) PARTIAL RESPONSE TRANSMISSION SYSTEM

(75) Inventor: Kouichi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 712 days.

(21) Appl. No.: 11/575,391

(22) PCT Filed: Sep. 16, 2005

(86) PCT No.: PCT/JP2005/017181

§ 371 (c)(1),
(2), (4) Date: Oct. 9, 2007

(87) PCT Pub. No.: WO2006/030911

PCT Pub. Date: Mar. 23, 2006

(65) Prior Publication Data

US 2008/0075160 A1    Mar. 27, 2008

(30) Foreign Application Priority Data

Sep. 17, 2004   (JP) ............................. 2004-271572

(51) Int. Cl.
*H03K 5/159* (2006.01)
(52) U.S. Cl. ........... 375/233; 375/229; 375/230; 375/231; 375/232; 375/263; 375/285; 375/290; 375/296; 708/300; 708/301; 708/323
(58) Field of Classification Search .......... 375/229, 375/233, 263, 285, 290, 296
See application file for complete search history.

(56) References Cited

U.S. PATENT DOCUMENTS

| 7,126,378 B2 * | 10/2006 | Stojanovic et al. ............ 326/87 |
| 7,447,278 B2 * | 11/2008 | Menolfi et al. .............. 375/340 |
| 2004/0104829 A1 * | 6/2004 | Shi ........................... 341/101 |

FOREIGN PATENT DOCUMENTS

| JP | 7-95247 A | 4/1995 |
| JP | 7-262712 A | 10/1995 |
| JP | 9-321671 A | 12/1997 |
| JP | 09-321671 A | 12/1997 |
| JP | 2002-223204 A | 8/2002 |
| JP | 2002-260346 A | 9/2002 |
| JP | 2003-6989 A | 1/2003 |
| JP | 2004-242327 A | 8/2004 |

* cited by examiner

*Primary Examiner*—David C Payne
*Assistant Examiner*—Leon Flores
(74) *Attorney, Agent, or Firm*—Sughrue Mion, PLLC

(57) ABSTRACT

A partial response signaling system includes a transmitter circuit configured to equalize input data in response to a control signal and to transmit a partial response signal through a transmission medium; and a receiver circuit configured to recover an output data from the partial response signal and to generate the control signal based on the partial response signal and an expected signal to output the control signal to the transmitter circuit.

12 Claims, 16 Drawing Sheets

1401: SAMPLING TIMING

Fig. 15

| 8-BIT INPUT | 10-BIT OUTPUT |
|---|---|
| xxxxx000 | xxxxx00011 |
| xxxxx001 | xxxxx00110 |
| xxxxx010 | xxxxx00111 |
| xxxxx011 | xxxxx01100 |
| xxxxx100 | xxxxx10011 |
| xxxxx101 | xxxxx11000 |
| xxxxx110 | xxxxx11001 |
| xxxxx111 | xxxxx11100 |

PARTIAL RESPONSE TRANSMISSION SYSTEM

This application claims priority from PCT Application No. PCT/JP2005/017181 filed Sep. 16, 2005, and from Japanese Patent Application No. 2004-271572 filed Sep. 17, 2004, which applications are incorporated herein by reference.

TECHNICAL FIELD

The present invention relates to partial response signaling for realizing high-speed signal transmission.

BACKGROUND ART

In recent years, in information processing performances of high-end servers and routers, a bottleneck is performance of a communication circuit of an LSI for communicating with an external unit rather than performance of a CPU within the LSI. As a result, there has been increased demand for a larger capacity of electrical transmission between chips and between backboards using SerDes or the like. A high-speed signal transmission is one of means for increasing a capacity of communication. However, it is not easy to speed up signal transmission in electrical transmission through a medium such as PCB. A frequency range in which the transmission medium permits a signal to be transmitted is limited. Therefore, when a transmission signal is of a high frequency, the signal waveform greatly attenuates so that the signal cannot be detected on a receiver circuit side.

A technique for permitting high-speed signal transmission in a limited transmission band is as partial response signaling. In the partial response signaling, the frequency range of a signal can be narrowed by allowing inter-symbol interference which can be removed later through a logic operation or the like. There are various types of partial response signaling according to types of inter-symbol interference, for example, duo-binary (1+D) and modified duo-binary (1−$D^2$). Here, D means a delay for one bit. The duo-binary (1+D) means duo-binary data obtained by adding a current data to previous duo-binary data for one bit (inter-symbol interference). In order to determine the current data in the duo-binary transmission, it is necessary to subtract the previous data for one bit from the received data. Furthermore, since inter-symbol interference occurs in the partial response signaling, the signal has more signal levels than input signal levels.

FIG. 1 is a diagram showing an eye opening in a duo-binary signal as an example of the partial response signal. It could be seen that as a result of the duo-binary signaling of a binary signal ternary eye opening is shown at a sampling timing 1401. FIG. 2 is a diagram showing a process of obtaining the originally transmitted binary data from the decision result of the duo-binary signal. The ternary output (−2, 0, 2) in the duo-binary signaling has the following data:

0: the previous bit is −1 and the current bit 1 or the previous bit is 1 and the current bit is −1,
2: the previous bit is 1 and the current bit 1,
−2: the previous bit is −1 and the current bit −1.

Therefore, if the initial bit data is assumed to be "1", the values are determined in a descending order and all data can be recovered, FIG. 3 is a block diagram of a general partial response signaling system. The system shown in FIG. 3 is provided with a transmitter circuit 1601, a transmission medium 1602 and a receiver circuit 1603. A data input 1604 is preliminarily waveform-shaped by a transmitter side FIR filter 1606, and output to the transmission medium 1602 by an output buffer 1607. The signal passing through the transmission medium 1602 greatly attenuates and reaches the receiver circuit 1603 as a weak signal containing inter-symbol interference. This signal is converted into a digital signal at a symbol rate by a multi-bit A/D converting circuit 1608 and supplied to a receiver side FIR filter 1609. The receiver side FIR filter 1609 shapes the signal waveform to compensate inter-symbol interference caused by influence of the transmission medium. The waveform of a partial response signal 1610 outputted from the receiver side FIR filter 1609 is compared with a threshold value by a decision circuit 1611 and the decision result becomes data output 1605.

The output of the decision circuit 1611 is also supplied to an adaptive equalization control circuit 1612. The adaptive equalization control circuit 1612 outputs a control signal 1617 to adjust characteristics of the receiver side FIR filter 1609 on the basis of differential data from an expected partial response signal. The expected partial response signal is given as digital data $d_n$ within the adaptive equalization control circuit 1612 and a difference between $d_n$ and the output data $y_n$ of the receiver side FIR filter 1609 becomes differential data $e_n$. That is, the relation is expressed by an equation: $e_n = d_n - y_n$. n adjusting method of the receiver side FIR filter 1609 in using the least mean squares method is expressed by the following equation:

$$w_n + 1 = w_n + \mu \cdot e_n \cdot y_n$$

where wn is a tap coefficient of the receiver side FIR filter 1609 and μ is an adjusting step. According to the above-mentioned equation, the coefficient $w_n$ of the receiver side FIR filter is updated. Such feedback loop formed of the receiver side FIR filter circuit 1609, the decision circuit 1611 and the adaptive equalization control circuit 1612 optimizes filter characteristics so that the output of the receiver side FIR filter 1609 may become the partial response signal.

On the other hand, the output data of the receiver side FIR filter 1609 and the output data of the decision circuit 1611 are supplied to a Mueller-Muller phase comparator 1614 in a clock data recovery circuit 1613. The Mueller-Muller phase comparator 1614 calculates whether the current clock is delayed or advanced with respect to an optimum clock and data timing by performing operation of the following equation:

$$\Delta \tau_n = y_n \cdot \hat{x}_{n-1} + y_{n-1} \cdot \hat{x}_n$$

where yn is the output data of the receiver side FIR filter 1609, and $$\hat{x}_n$$

is the output data of the decision circuit 1611. Based on the calculation result, the phase of an oscillation circuit 1615 is adjusted and timing of a recovered clock 1616 input to the A/D converting circuit 1608 varies. Such feedback loop formed of the A/D converting circuit 1608, the receiver side FIR filter 1609, the Mueller-Muller phase comparator 1614 and the oscillation circuit 1615 controls the phase of the recovered clock 1616 to be an optimum position. By the above-mentioned mechanism, data can be accurately transmitted and received in the partial response signaling system shown in FIG. 3.

However, the system shown in FIG. 3 cannot operate at a high speed and with low power consumption due to problems of the receiver side FIR filter 1609 which is used for waveform equalization of data, and the clock data recovery circuit 1613. The reasons will be described below.

FIG. 4 is a block diagram showing an example of the FIR filter used on the receiver and transmitter sides. FIG. 4 is an example of a 6-tap FIR filter which is composed of delay circuits 1702 to 1706, multiplying circuit 1707 to 1712 and an adding circuit 1713. The delay circuits 1702 to 1706 delay data by a time period D4 corresponding to one symbol. From a data input 1701, the delay circuits 1702 to 1706 produce six data which are delayed by 0, 1D, 2D, 3D, 4D and 5D, respectively. The these data are weighted through the multiplying circuits 1707 to 1712 by W0, W1, W2, W3, W4, and W5, respectively, and supplied to the adding circuit 1713. The addition result becomes a data output 1714. As described above, in the FIR filter, addition, subtraction and multiplication need to be performed at least at a symbol rate. However, in the receiver side FIR filter, the data input 1701 becomes multi-bit digital data output from the A/D converting circuit. Since addition, subtraction and multiplication of multi-bit data require many calculations, the FIR filter cannot operate at the high speed.

On the other hand, similarly, the Mueller-Muller phase comparator used in the clock recovery circuit cannot operate at the high speed because of addition, subtraction and multiplication. However, for the clock recovery circuit, a classic binary phase comparator may be used in place of the Mueller-Muller phase comparator. By using the binary phase comparator and doubly oversampling, a high-speed clock recovery can be easily achieved. In the clock recovery using the doubly oversampling, two clocks which have 0.5 symbol timing difference from each other are used to decide a signal at data sampling points and a transition point between the data sampling points. By performing the following simple logic operation based on the decision result, $$up_n = xor(\hat{x}_{n-1}, \hat{x}_{n+0.5})$$

$$down_n = xor(x_{n+0.5}, \hat{x}_n)$$

a binary phase comparison result is obtained that the clock timing is down (delayed) or up (advanced) relative to the optimum timing. Here, $$\hat{x}_n, \hat{x}_{n+1}$$

is a decision result at the data sampling point, and $$\hat{x}_{n+0.5}$$

is a decision result at the transition point.

However, in the partial response signaling, an accurate operation of the binary phase comparator cannot be expected. In the partial response transmission, since a frequency range of signal is narrowed by allowing removable inter-symbol interference, certain frequency components of the signal are greatly attenuated due to inter-symbol interference. Consequently, although a signal passing through the transition point is fixed to a certain value after 0.5 symbols in the normal signaling, a signal passing through the transition point is not necessarily fixed at a certain value after 0.5 symbol in the partial response signaling. That is, there is a possibility that a correct value cannot be decided.

This will be described using duo-binary signaling as an example of the partial response signal. In FIG. 5, a sample at the transition point and a sample at the signal sampling point correspond to samples at sampling timings 1801 and 1802, respectively. In the duo-binary signal in FIG. 5, since the symbol-rate signal which includes 010/101 sequence is greatly attenuated, a sufficient eye opening is not obtained at the sampling timing 1802. That is, when only the signal which varies at the symbol rate is transmitted, a correct value cannot be obtained at the sampling timing 1802. As a result, the oversampling binary phase comparator cannot perform phase comparison, and thus, clock recovery cannot be achieved.

In conjunction with the above description, a signal path monitoring method is disclosed in Japanese Laid Open Patent Application (JP-A-Heisei 7-95247). The signal path monitoring method in this conventional example is used when signal paths between a transmitting unit and a receiving unit which are connected by the signal paths, are monitored. A transmitting section is provided in the transmitting unit for each signal path and a receiving section is provided in the receiving unit for each signal path. In the transmitting section, a scrambler randomly codes a transmission main signal to obtain a random code sequence. A coding circuit performs partial response coding on the random code sequence to obtain a partial response code sequence. A transmission pattern detecting circuit receives partial response containing a precoder and an output code sequence from the precoder and detects whether or not a predetermined pattern exists in the output code sequence. When the predetermined pattern exists, the transmission pattern detecting circuit outputs a detection signal. When a polarity operating circuit receives the detection signal, the polarity operating circuit reverses the polarity of the partial response code sequence to obtain a reverse signal and sends the reverse signal to the signal path as a transmission signal. When the polarity operating circuit does not receive the detection signal, the polarity operating circuit sends the partial response code sequence to the signal path as the transmission signal. In the reception section, a partial response decoding circuit receives the transmission signal as a reception partial response code sequence and partial response-decodes the transmission signal to obtain a decoding signal. A descrambler descrambles the decoding signal to obtain a reception main signal. A reception pattern detecting circuit detects whether or not a predetermined pattern exists in the reception partial response code sequence and outputs a pattern detection result. A violation detecting circuit detects violation accompanied by polarity reversal according to the reception partial response code sequence and outputs a violation detection result. A monitoring section monitors abnormality of the signal path on the basis of the pattern detection result and the violation detection result.

A PRML recovery circuit is disclosed in Japanese Laid Open Patent Application (JP-A-Heisei 7-262712). In this conventional example, by utilizing generation of a partial response signal by maximum likelihood sequential detection, a distance of slice level is optimally set and suitable maximum likelihood decoding is performed. A waveform equalizing circuit equalizes waveform of a read-out signal from a recording medium. A maximum likelihood decoder slices the equalized output in a +1 side slice level and a −1 side slice level to obtain a discrimination value. Then, the discrimination value is maximum likelihood decoded. A control circuit variably controls the distance between the +1 side slice level and the −1 side slice level.

Also, a high-speed serial transmission system is disclosed in Japanese Laid Open Patent Application (JP-P2002-223204A). The high-speed serial transmission system in this conventional example has a transmitting unit and a receiving unit. The transmitting unit has a pattern generating unit for generating a pseudo random pattern, a transmission circuit unit for serially converting a transmission input data and the pseudo random pattern, a transmission control unit for outputting a transmission clock control signal and a current control signal, a current control circuit for current-controlling serial data, and a transmission clock circuit for varying a transmission clock frequency. The receiving unit has a reception circuit unit for inversely transforming reception input data in parallel and outputting reception output data and the pseudo random pattern, a bit error measuring unit for measuring a bit error rate of the pseudo random pattern, a reception level detecting unit for detecting a reception level, a reception control unit for feeding back the bit error rate and characteristic data on the reception level and a reception clock circuit for generating a reception clock in synchronization with a transmission clock.

Also, a reproducing apparatus is disclosed in Japanese Laid Open Patent Application (JP-P2002-260346A). In the reproducing apparatus in this conventional example, a run length limiting code recorded in a recording medium is recovered, and a reproduction signal is subjected to partial response equalization by using a transversal filter, and decoded. For this reason, a sampling output unit distributes a signal obtained by sampling the reproduction signal or a signal obtained by further resampling and interpolating the sampling signal into an even number reproduction data signal and an odd number reproduction data signal and outputs the signals in parallel. An even number filtering unit filters the even number reproduction signal on the basis of a first tap coefficient and outputs the signal as a first waveform equalized reproduction signal. An odd number filtering unit filters the odd number reproduction signal on the basis of a second tap coefficient and outputs the signal as a second waveform equalized reproduction signal. An even number temporary determining circuit calculates a temporary determination value of an even number filtered signal and outputs a differential value between the temporary determination value and the even number filtered signal as an even number error signal. An odd number temporary determining circuit calculates a temporary determination value of an odd number filtered signal and outputs a differential value between the temporary determination value and the odd number filtered signal as an odd number error signal. A first tap coefficient generating unit variably generates the first tap coefficient of the even number filtering unit on the basis of the even number error signal and the even number reproduction signal from the even number temporary determining circuit so that the even number error signal may be minimum. A second tap coefficient generating unit variably generates the second tap coefficient of the odd number filtering unit on the basis of the odd number error signal and the odd number reproduction signal from the odd number temporary determining circuit so that the odd number error signal may be minimum. A decoding unit decodes the first waveform equalized reproduction signal outputted from the odd number filtering unit and the second waveform equalized reproduction signal outputted from the even number filtering unit.

Also, a reproducing apparatus is disclosed in Japanese Laid Open Patent Application (JP-P2003-6989A). In the reproducing apparatus in this conventional example, a signal recorded in a recording medium is reproduced and the reproduction signal is subjected to partial response equalization by using a filtering unit and decoded. In the filtering unit, a sampling unit samples the reproduction signal at a predetermined clock and outputs a sampled signal. A transversal filter delays the sampled signal to obtain multi-stage delay tap outputs, multiplies only an even number or odd number of the multi-stage delay tap outputs by the tap coefficient, adds the multiplication results and outputs it as a filtered signal. A temporary determining circuit calculates a temporary determination value of the filtered signal and outputs a differential value between the temporary determination value and the filtered signal as an error signal. A coefficient generating unit variably controls only the even number or odd number tap coefficient of the transversal filter on the basis of the error signal and the reproduction signal so that the error signal may be minimum.

DISCLOSURE OF INVENTION

An object of the present invention is to provide a high-speed partial response signaling system which is not limited with operation speed of a receiver side equalizing circuit.

Another object of the present invention is to provide a high-speed partial response signaling system which is not limited with operation speed of a Mueller-Muller phase comparator and operations of a binary phase comparator.

In an aspect of the present invention, a partial response signaling system has a transmitter circuit which equalizes input data in response to a control signal and transmits a transmission signal through a transmission medium and a receiver circuit which recovers output data from the transmission signal and generates the control signal on the basis of the transmission signal and an expected signal to output the control signal to the transmitter circuit.

Here, it is preferred that the transmitter circuit has a transmitter side equalizing circuit which equalizes input data in response to the control signal. The transmitter circuit may include a 2-bit transition guarantee encoding circuit which codes the input data of n parallel bits to (n+2)-bit data containing transition in units of 2 bits to generate input coded data and a transmitter side equalizing circuit which equalizes the input coded data in response to the control signal. Alternatively, the transmitter circuit may include a transition guarantee encoding circuit which encodes the input data of n parallel bits to (n+m)-bit data containing m-bit transition and a transmitter side equalizing circuit which equalizes the input coded data in response to the control signal.

It is preferred that the transmitter side equalizing circuit has an FIR (Finite Impulse Response) filter. The FIR filter may have a plurality of serially-connected delay circuits and a plurality of variable output drivers which are connected to outputs of the plurality of delay circuits and a head input of the plurality of delay circuits and outputs data corresponding to predetermined weights. Alternatively, the FIR filter may have a plurality of sequences of delay circuits, a plurality of parallel-serial converting circuits which receive data outputted from corresponding delay circuits of the plurality of sequences and serially output the data, receive data outputted from the delay circuits of one of the plurality of sequences and the delay circuit previous to another sequence and serially output the data, and receive data from an input and an output of a head delay circuit in one sequence of the plurality sequences and serially output the data, and a plurality of variable output drivers which are provided with respect to the plurality of parallel-serial converting circuits and output data corresponding to predetermined weights.

The receiver circuit may have a clock data recovery circuit which recovers the output data from the partial response signal as the transmission signal and an adaptive equalization control circuit which generates the control signal from the partial response signal and the output data.

The receiver circuit may have an adder which adds the partial response signal as the transmission signal to a feedback signal to generate an added partial response signal, a clock data recovery circuit which recovers the output data from the added partial response signal, an adaptive equalization control circuit which generates the control signal from the added partial response signal and the output data, and a decision feedback type equalizing circuit which generates the feedback signal from the output data.

The receiver circuit may have a receiver side equalizing circuit which equalizes the partial response signal as the transmission signal to generate an equalized partial response signal, a clock data recovery circuit which generates the output data from the equalized partial response signal and an adaptive equalization control circuit which generates the control signal from the partial response signal and the output data.

The receiver circuit may have a clock data recovery circuit which recovers the output data from a duo-binary signal as the transmission signal and an adaptive equalization control circuit which generates the control signal from the duo-binary signal and the output data.

The receiver circuit may have a clock data recovery circuit which recovers the output data from the partial response signal as the transmission signal and an adaptive equalization control circuit which generates the control signal from the partial response signal and the output data.

The receiver circuit may have a receiver side equalizing circuit which equalizes the partial response signal as the transmission signal to generate an equalized partial response signal, an adder which adds the feedback signal to the equalized partial response signal to generate an added partial response signal, a clock data recovery circuit which recovers the output data from the added partial response signal, an adaptive equalization control circuit which generates the control signal from the added partial response signal and the output data and a decision feedback type equalizing circuit which generates the feedback signal from the output data.

The clock data recovery circuit may have first and second decision circuits which operates in response to first and second recovered clocks and outputs decision results of the partial response signal as the transmission signal, the first and second recovered clocks having different timings, a binary type phase comparator which compares the decision results and recovers the output data and an oscillation circuit which outputs the first and second recovered clocks on the basis of a comparison result by the binary type phase comparator.

The clock data recovery circuit may have first and second decision circuits which operates in response to first and second recovered clocks and outputs decision results of the partial response signal as the transmission signal, the first and second recovered clocks having different timings, a binary type phase comparator which compares the decision results and recovers the output data and a variable delay circuit which outputs the first second recovered clock on the basis of the comparison result by the binary type phase comparator and the input clock.

As described above, in the partial response signaling system of the present invention, a partial response signal before equalization inputted to the receiver circuit as a differential signal is supplied to a differential decision circuit using an intermediate voltage as a threshold value. An output of the decision circuit is supplied to the adaptive equalization control circuit as an error signal, and the output of the adaptive equalization control circuit is supplied to the transmitter side equalizing circuit as the control signal. Thus, the intended partial response signal is obtained. Furthermore, in the partial response signaling system of the present invention, the transmission data from the transmitter circuit is encoded by the transition guarantee encoding circuit, and clock recovery can be achieved in the receiver circuit.

BRIEF DESCRIPTION OF DRAWINGS

FIG. 15 is a diagram showing an example of encoding by a 2-bit transition guarantee encoding circuit in the partial response signaling system according to the sixth embodiment of the present invention;

BEST MODE FOR CARRYING OUT THE INVENTION

Hereinafter, a partial response signaling system of the present embodiment will be described with reference to the attached drawings.

First Embodiment

Figure 6:
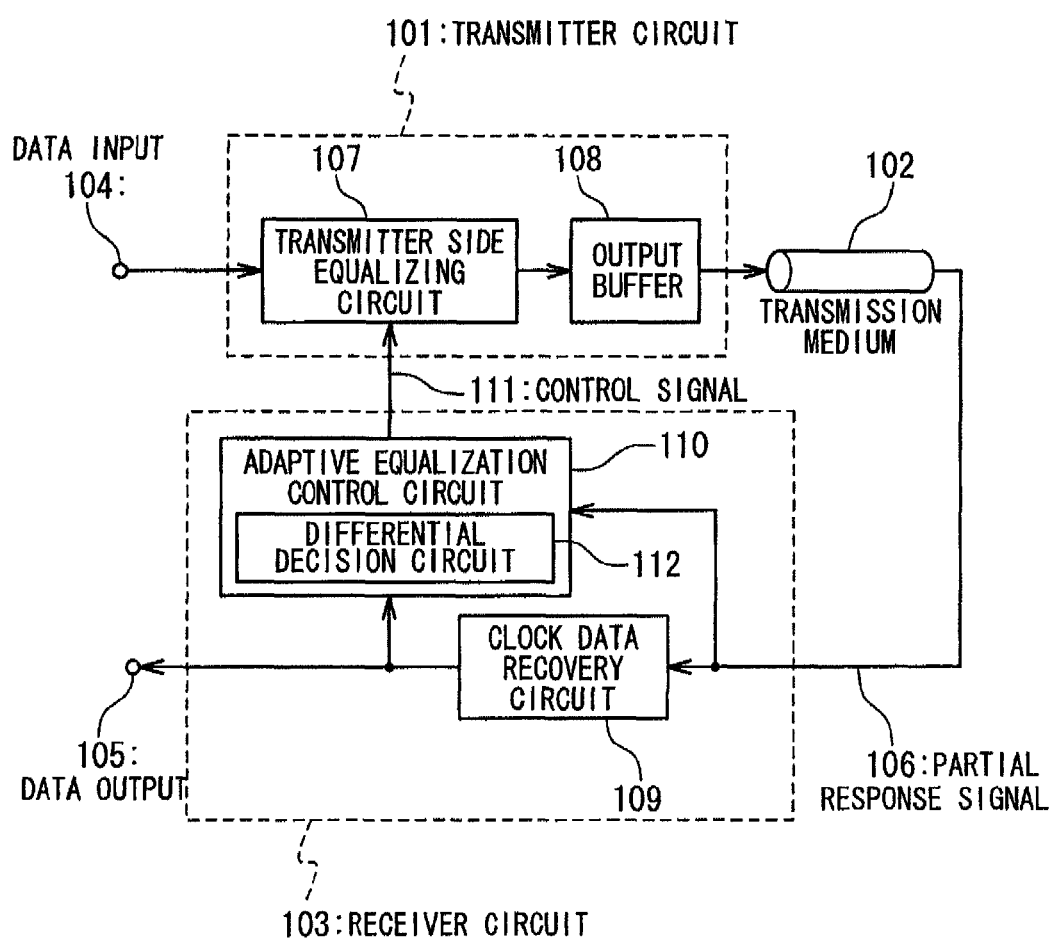
FIG. 6 is a block diagram showing the configuration of a partial response signaling system according to a first embodiment of the present invention.

FIG. 6 is a block diagram showing configuration of a partial response signaling system according to the first embodiment of the present invention. As shown in FIG. 6, the partial response signaling system has a transmitter circuit 101, a transmission medium 102 and a receiver circuit 103. A data input 104 is equalized and waveform-shaped by a transmitter side equalizing circuit 107, and then outputted to the transmission medium 102 by an output buffer 108, A partial response signal passing through the transmission medium 102 reaches the receiver circuit 103 and is supplied to a clock data recovery circuit 109 and an adaptive equalization control circuit 110 in the receiver circuit 103. The adaptive equalization control circuit 110 of the receiver circuit 103 transmits a control signal 111 determined based on difference data between the signal and an expected partial response signal, to the transmitter side equalizing circuit 107. Thus, the characteristics of the transmitter side equalizing circuit 107 are adjusted. A voltage value of the expected partial response signal is given as analog reference voltage Dn in the adaptive equalization control circuit 110. By comparing this voltage with a voltage Yn of the supplied partial response signal 106, the difference data sign(en) is obtained. That is, the relationship is expressed by the following equation:

$$\text{sign}(e_n) = \text{sign}(D_n - Y_n)$$

In case that the transmitter side equalizing circuit 107 is configured by an FIR filter, algorithm called as Sign-Sign Least Mean Square is used and an adjusting method is expressed by the following equation:

$$w_{n+1}^k = w_n^k + \mu \cdot \text{sign}(e_n) \cdot \hat{x}_{n-k}$$

where $w_n^k$ is a k-th tap coefficient of the FIR filter and $\mu$ is an adjusting step.

$\hat{x}_{n-k}$ is a data output 105 corresponding to the tap coefficient. Through the operation of the above-mentioned equations, the characteristics of the transmitter side equalizing circuit 107 are updated. With such a feedback loop configuration containing such a transmission medium 102, the characteristics of the transmitter side equalizing circuit 107 are optimized so that the expected partial response signal 106 may be obtained as an input of the clock data recovery circuit 109. The clock data recovery circuit 109 obtains the data output 105 through recovery of an optimum timing clock with respect to the partial response signal 106.

However, when the partial response signal 106 generated by using the transmitter side equalizing circuit 107 is optimized, since a signal outputted from the output buffer 108 is supplied to the receiver circuit 103 through the transmission medium 102 having unclear characteristics, it is impossible to uniquely determine how reference level $D_n$ of the expected partial response signal 106 is set. Therefore, a new adjusting mechanism for setting the suitable reference level $D_n$ is required, resulting in complexity of a system and increase in power consumption.

One feature of the partial response signaling system according to the first embodiment of the present invention is in that the difference data sign($e_n$) is obtained without adjusting the reference level $D_n$. The partial response signal 106 has levels of odd number which is generally expressed by 2m−1 or 4m−3 (m=2n, n is a natural number). Thus, when a highest level and a lowest level of the partial response signal 106 are defined as $V_{max}$ and $V_{min}$, respectively, the signal contains a medium level corresponding to $V_{mid} = (V_{max} + V_{min})/2$. When the partial response signal is a differential signal, the medium level $V_{mid}$ is equal to intermediate level of the differential signal and can be uniquely determined on the receiver side irrespective of the characteristics of the transmission medium 102. Comparison with the intermediate level of the differential signal can be easily performed by using a differential decision circuit 112. Therefore, when the data output $(\hat{x}_n)$ 105 is $V_{mid}$, the difference data, $$\text{sign}(e_n) = \text{sign}(V_{mid} - Y_n) | \hat{x}_n = V_{mid}$$

is obtained from the differential decision circuit 112 by using the intermediate potential of the difference as a threshold value. Thereby, the characteristics of the transmitter side equalizing circuit 107 are optimized without adjusting the reference signal Dn.

Figure 7:
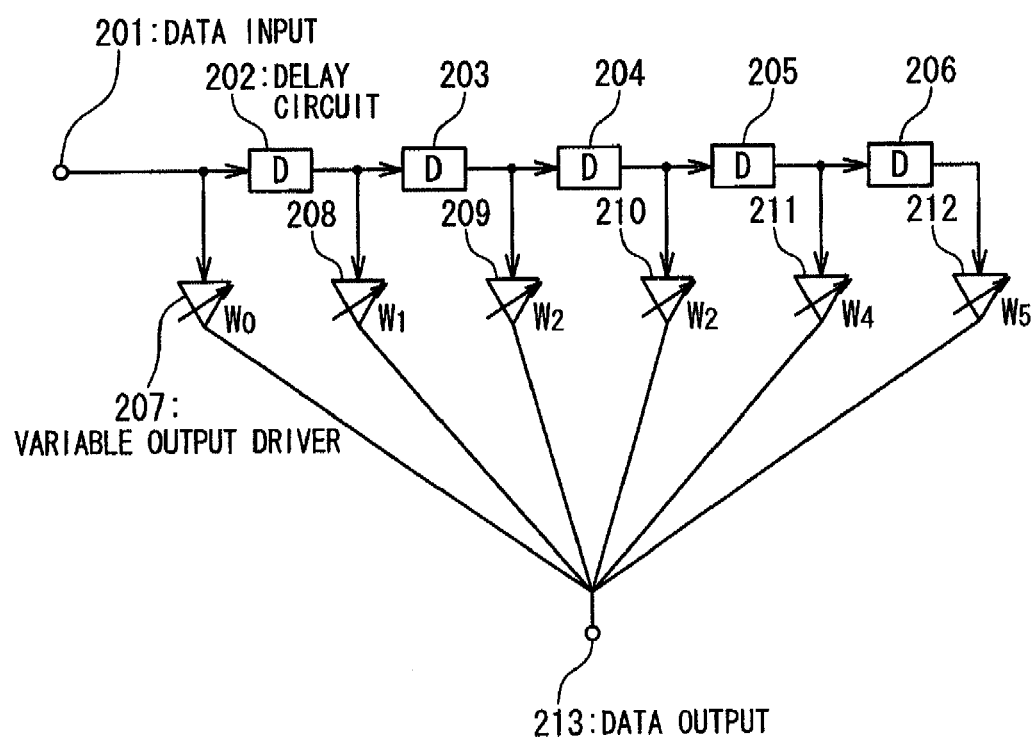
FIG. 7 is a block diagram showing an example of a transmitter side equalizing circuit and an output buffer in the partial response signaling system according to the first embodiment of the present invention.

FIG. 7 is a block diagram showing an example of the transmitter side equalizing circuit and the output buffer. The circuit shown in FIG. 7 is a 6-tap FIR filter and has delay circuits (D) 202 to 206 and variable output drivers 207 to 212 corresponding to multiplying circuits and outputting data corresponding to predetermined weights. Since a data input 201 of the transmitter side FIR filter is digital data to be transmitted, the data is always a 1-bit signal. Accordingly, by driving the transmission medium in parallel using the variable output drivers 207 to 212, the 1-bit data supplied to each of the drivers can be multiplied and added. Since such combination between the transmitter side equalizing circuit and the output buffer permits waveform shaping without performing multi-bit operations, very high-speed operations can be achieved, thereby obtaining the data output 213.

Figure 8:
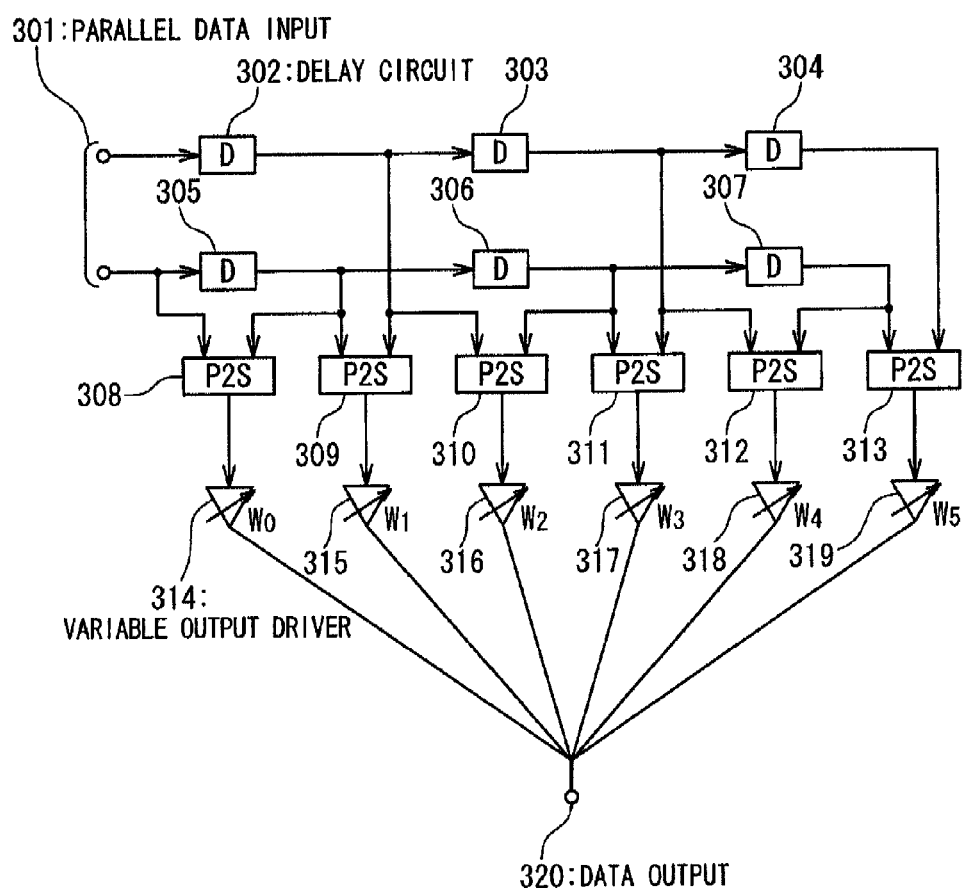
FIG. 8 is a block diagram showing another example of the transmitter side equalizing circuit and the output buffer in the partial response signaling system according to the first embodiment of the present invention.

FIG. 8 shows another example of the transmitter side equalizing circuit and the output buffer. The circuit shown in FIG. 8 is a 6-tap FIR filter and has delay circuits (D) 302 to 307, parallel serial converting circuits (P2S) 308 to 313, and variable output drivers 314 to 319 corresponding to multiplying circuits. A delay circuit sequence is formed for each bit of a parallel data input. The parallel serial converting circuits 308 to 313 include circuits 309, 311, and 313 which receive data from the respective outputs of the corresponding delay circuit sequence and serially output the data. The parallel to serial converting circuits 308 to 313 also include circuits 310, 312 which receive data from the output of the corresponding delay circuit in one delay circuit sequence and the output of the delay circuit previous to the corresponding delay circuit in another delay circuit sequence and serially output the data. The parallel to serial converting circuits 308 to 313 further include the circuit 308 which receives data from the input and the output of the first delay circuit in one delay circuit sequence. The variable output drivers 314 to 319 are provided for the parallel to serial converting circuits (P2S) 308 to 313. This circuit is different from the circuit shown in FIG. 7 in that parallel data inputs 301 supplied in parallel pass through the delay circuits and parallel-serial converted to form input data of the variable output drivers. With such a configuration, the operation speed of the delay circuits 302 to 307 which are often constituted by a flip-flop is reduced to a half. Therefore, with such a circuit configuration, the much faster operation of the transmitter side equalizing circuit can be achieved to obtain the data output 320.

In this manner, by adopting the configuration shown in FIG. 6, the waveform of the partial response signal can be equalized without using a receiver side FIR filter with limited operation speed. For this reason, the high-speed partial response signaling system can be realized.

Second Embodiment

Figure 9:
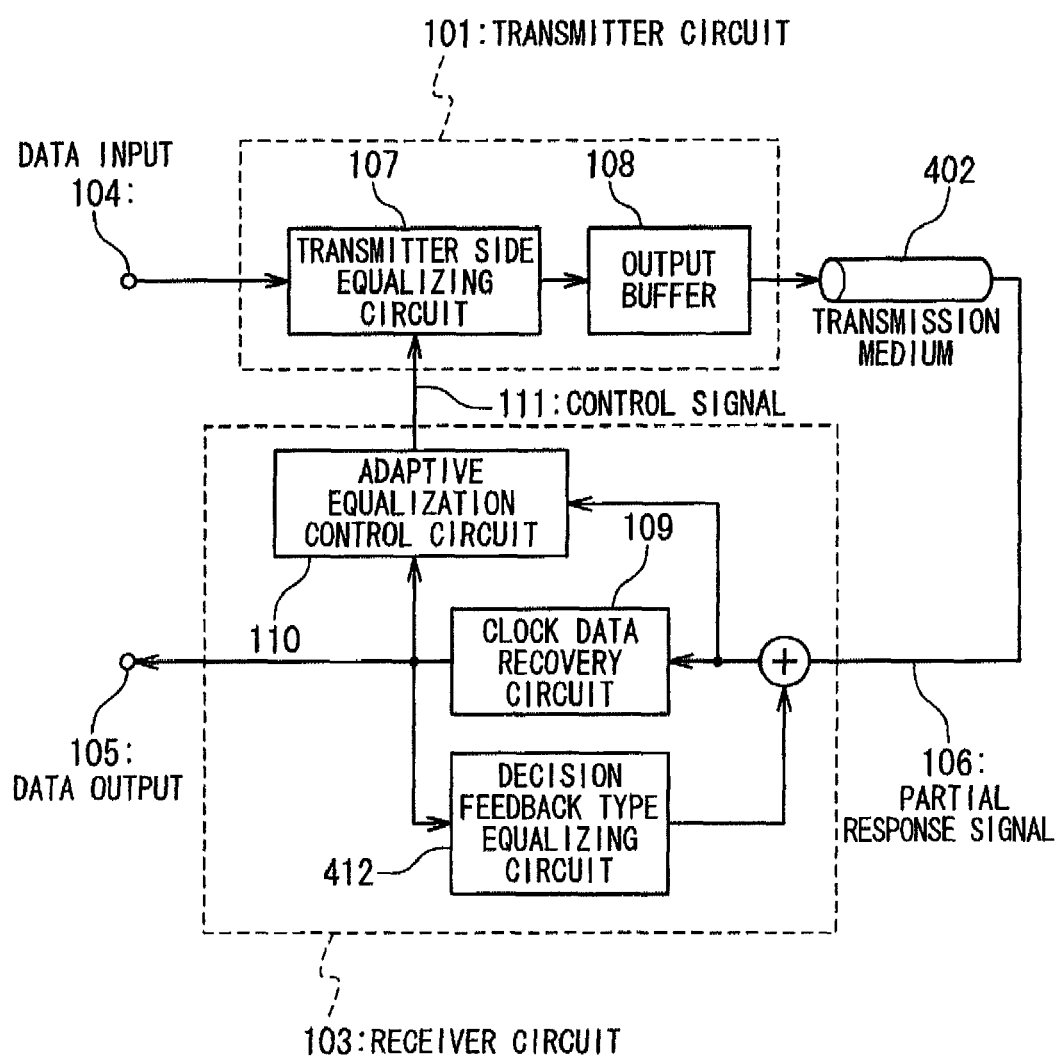
FIG. 9 is a block diagram showing the configuration of the partial response signaling system according to a second embodiment of the present invention.

FIG. 9 is a block diagram showing the configuration of the partial response signaling system according to the second embodiment of the present invention. The circuit shown in FIG. 9 has the configuration obtained by adding a decision feedback type equalizing circuit 412 to the partial response signaling system shown in FIG. 6. Waveform distortion of the signal caused by the transmission medium 402 includes not only inter-symbol interference due to loss by the transmission medium 402 but also signal reflection" which is caused by discontinuity in the transmission medium 402 and in which influence of data transmitted previously appears with a large delay on the receiver side. When this reflection cannot be ignored, it is dealt with by using the decision feedback type equalizing circuit 412. Since the decision feedback type equalizing circuit 412 only needs to address the influence appearing with the large delay with respect to the received data, there is a sufficient timing margin for operation. That is, the operation speed does not limit the transmission speed of the partial response signaling system.

Third Embodiment

Figure 1:
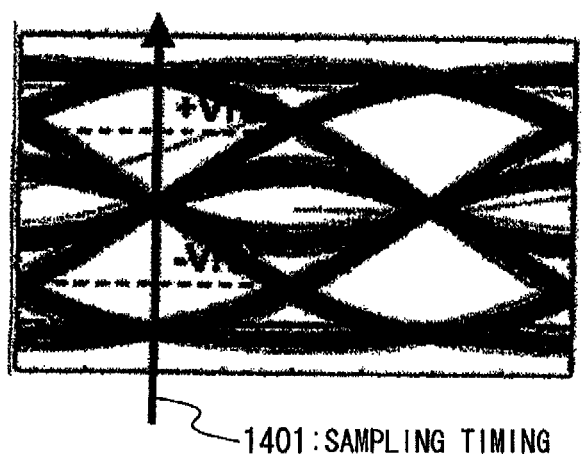
FIG. 1 is a diagram showing an eye opening in a duo-binary signal as an example of the partial response signal.
Figure 2:
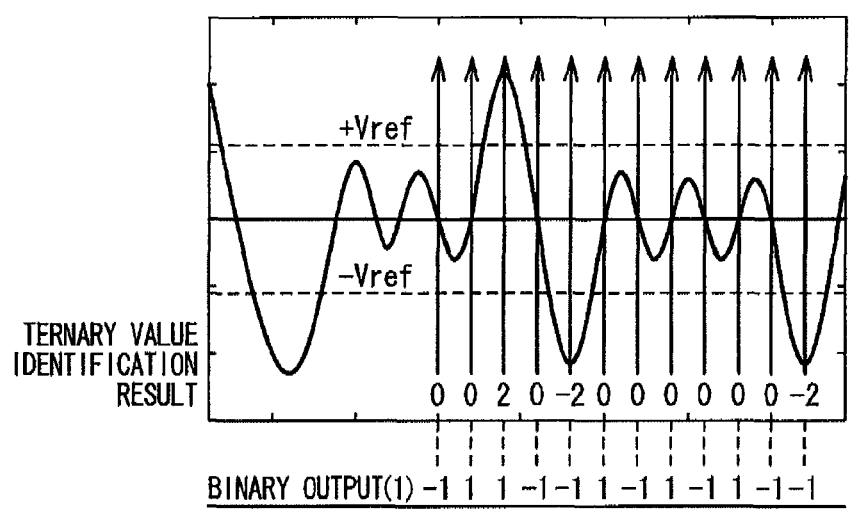
FIG. 2 is a diagram showing a conventional method of duo-binary signaling as an example of partial response transmission.
Figure 3:
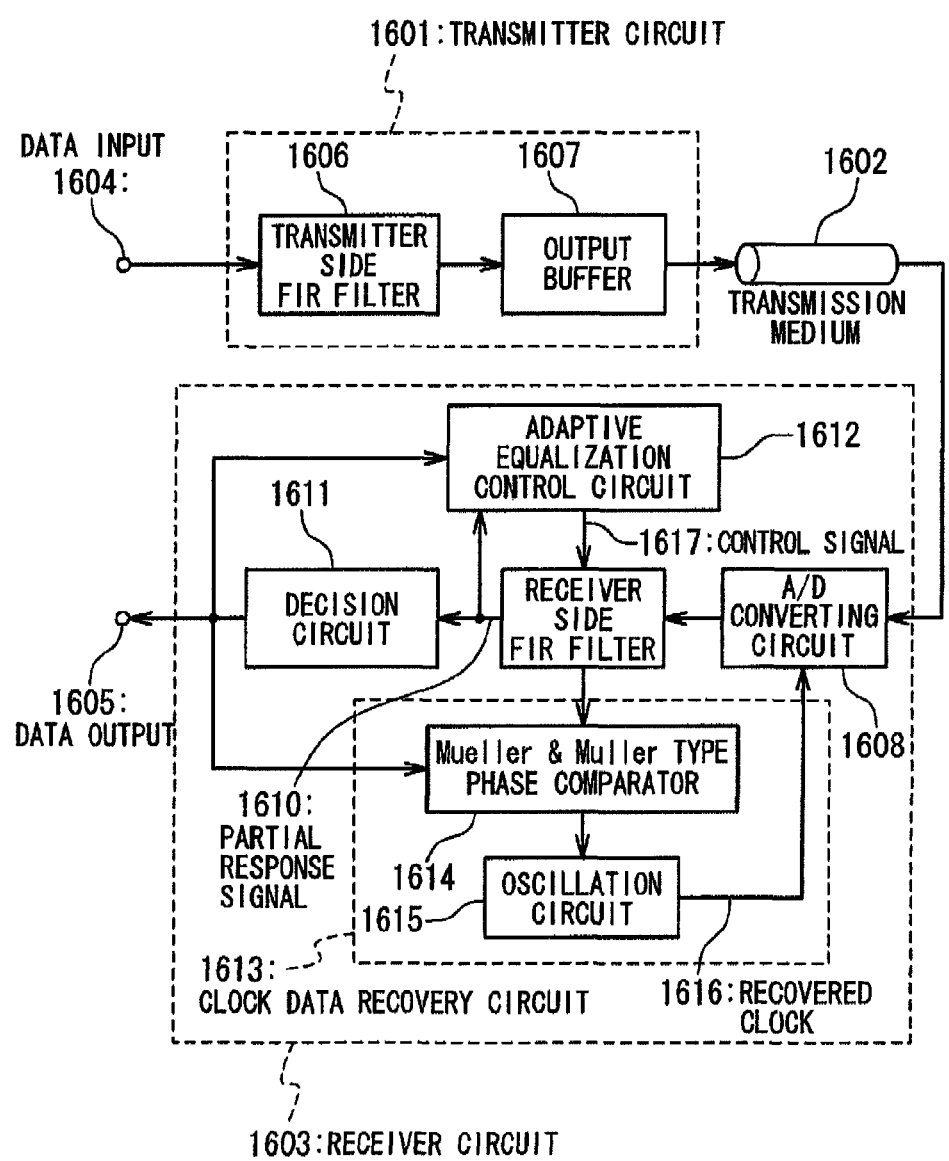
FIG. 3 is a block diagram showing a conventional partial response signaling system.
Figure 4:
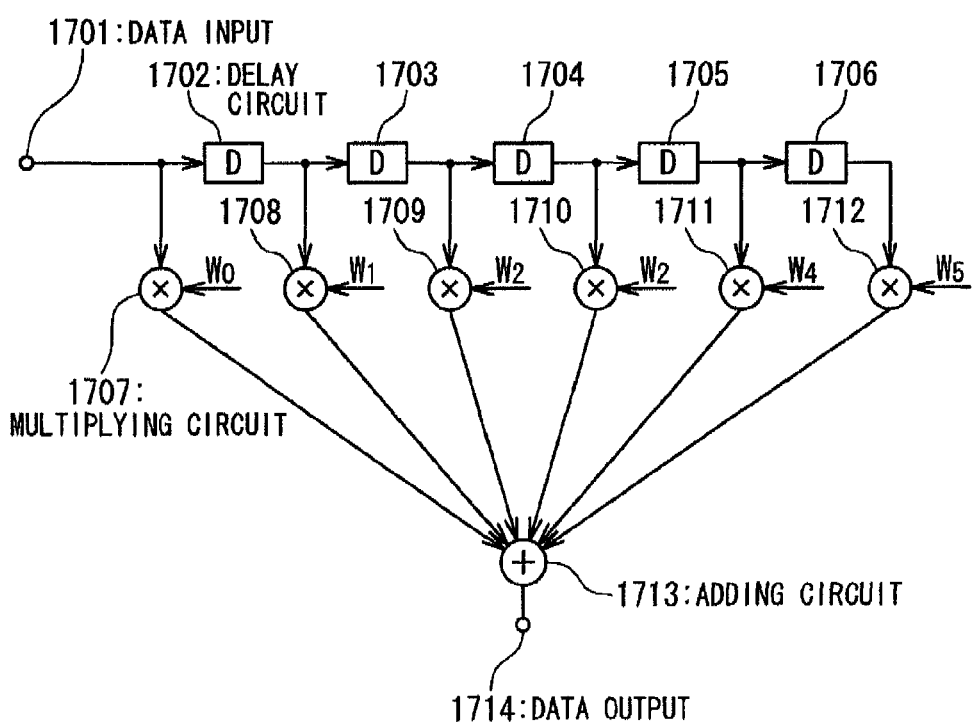
FIG. 4 is a block diagram showing a receiver side FIR filter in the conventional partial response signaling system.
Figure 5:
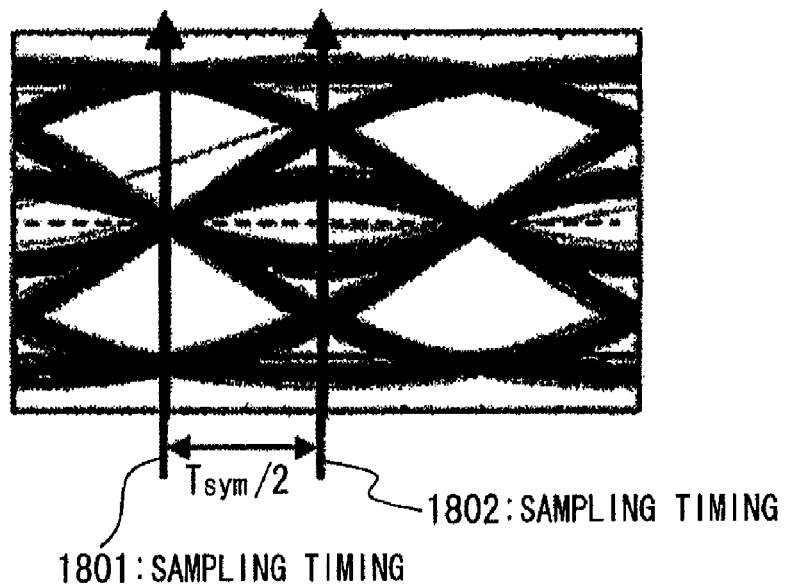
FIG. 5 is a diagram showing conventional sampling timings of the partial response signal.
Figure 10:
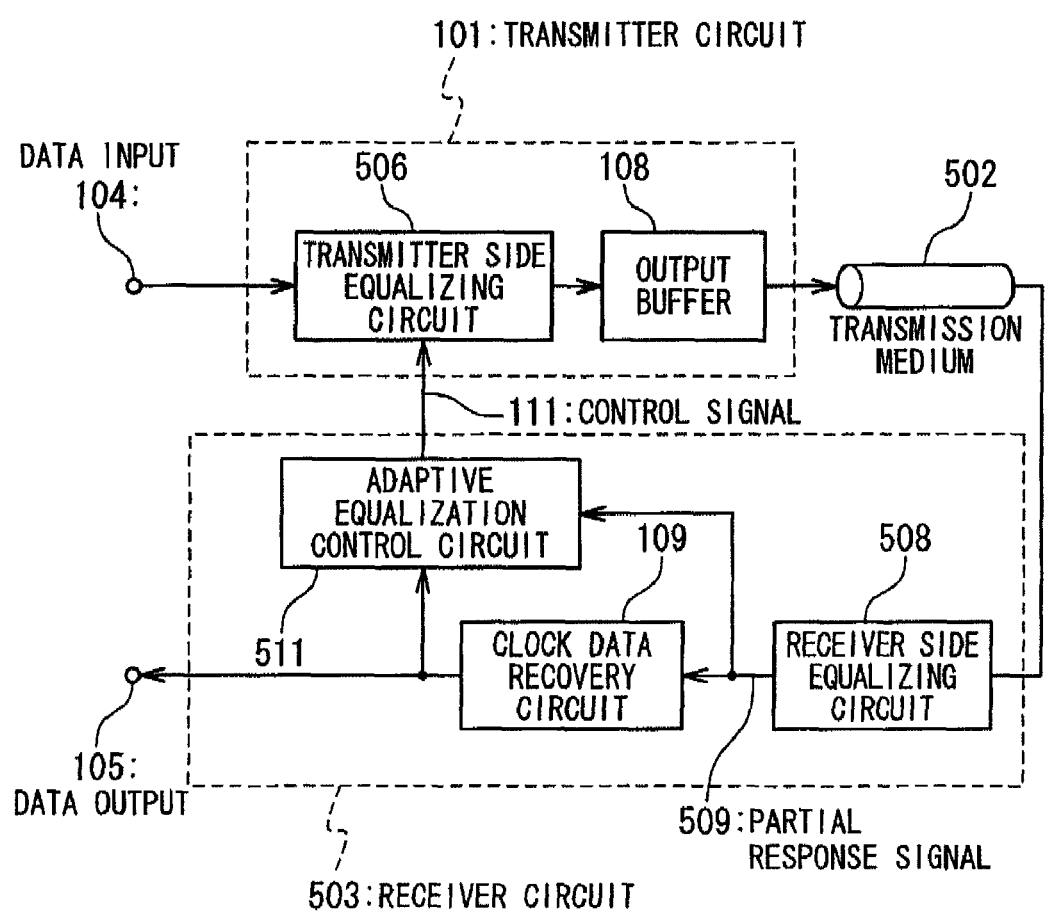
FIG. 10 is a block diagram showing the configuration of the partial response signaling system according to a third embodiment of the present invention.

FIG. 10 is a block diagram showing the configuration of the partial response signaling system according to the third embodiment of the present invention. The circuit shown in FIG. 10 has the configuration obtained by adding a receiver side equalizing circuit 508 in the receiver circuit 503 of the partial response signaling system shown in FIG. 6. Unlike the receiver side FIR filter 1609 shown in FIG. 3, the receiver side equalizing circuit 508 has fixed characteristics. The receiver side equalizing circuit 508 has a waveform-shaping function. The adaptive equalization control circuit 511 optimizes transmission characteristics of the transmitter side equalizing circuit 506 on the basis of a signal waveform-distorted by the transmission medium 502 and waveform-shaped by the receiver side equalizing circuit 508. As a result, an expected partial response signal 509 is obtained as an output of the receiver side equalizing circuit 508. An equalizing circuit which can operate at a high speed, though not with a high accuracy, such as a high-pass filter using a passive element is used for the receiver side equalizing circuit 508.

Fourth Embodiment

Figure 11:
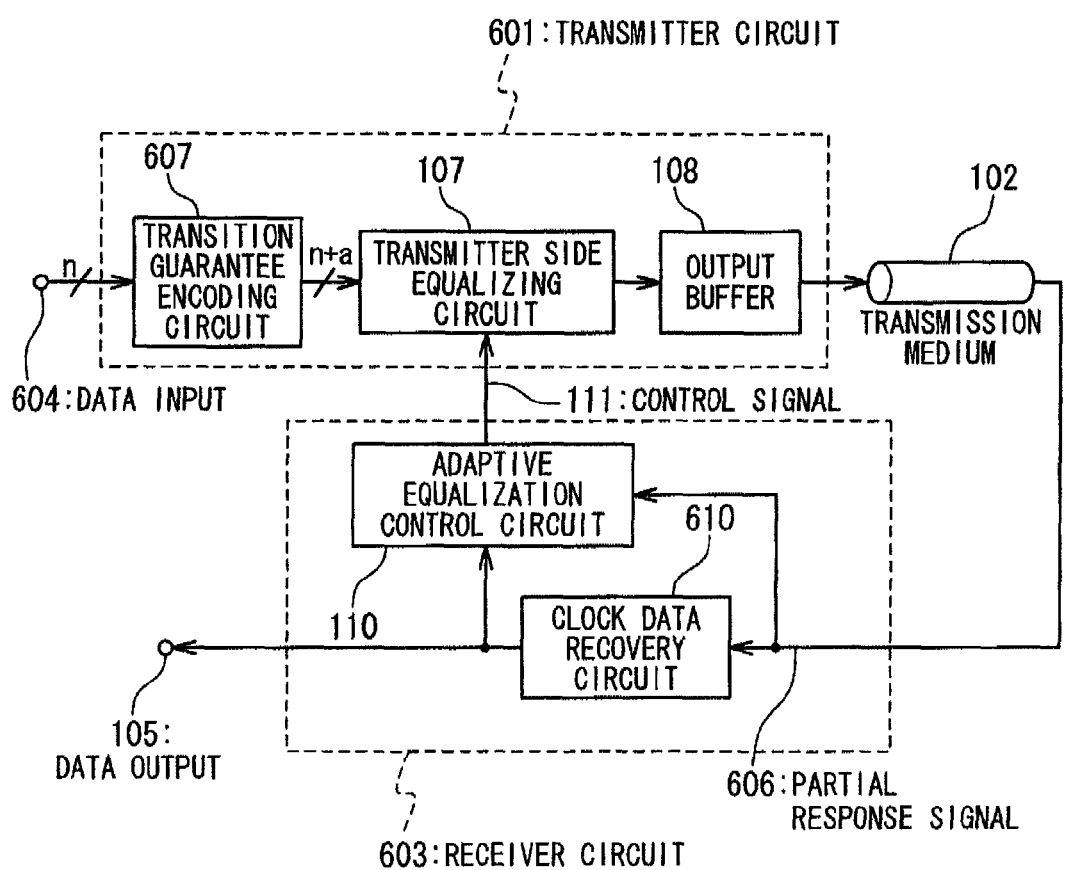
FIG. 11 is a block diagram showing configuration of the partial response signaling system according to a fourth embodiment of the present invention.

FIG. 11 is a block diagram showing the configuration of the partial response signaling system according to the fourth embodiment of the present invention. The circuit shown in FIG. 11 has the configuration obtained by adding a transition guarantee encoding circuit 607 to the partial response signaling system shown in FIG. 6. A partial response signal 606 has inter-symbol interference inherent to the partial response signal. Thus, when a binary phase comparator which is advantageous to speed-up is used, a correct clock cannot be recovered by a clock data recovery circuit 610. For this reason, in the partial response signaling in the present embodiment, it is noted that the inter-symbol interference inherent to the partial response signal can be predicted and a data sequence in which clock can be recovered even with the influence of inter-symbol interference can be also predicted. By using the transition guarantee encoding circuit 607, an n-bit parallel data input 604 is encoded to a (n+a)-bit data so that the output of the circuit 601 may contain the clock recoverable data sequence. As a result, the clock recovery circuit 610 of the receiver circuit 603 can recover the correct clock. Thus, high-speed partial response signaling system can be achieved. Here, given that an output of a transition guarantee encoding circuit 607 is n bits, the bit length becomes longer due to coding and the output becomes (n+a) bits (n, a are natural numbers).

Fifth Embodiment

Figure 12:
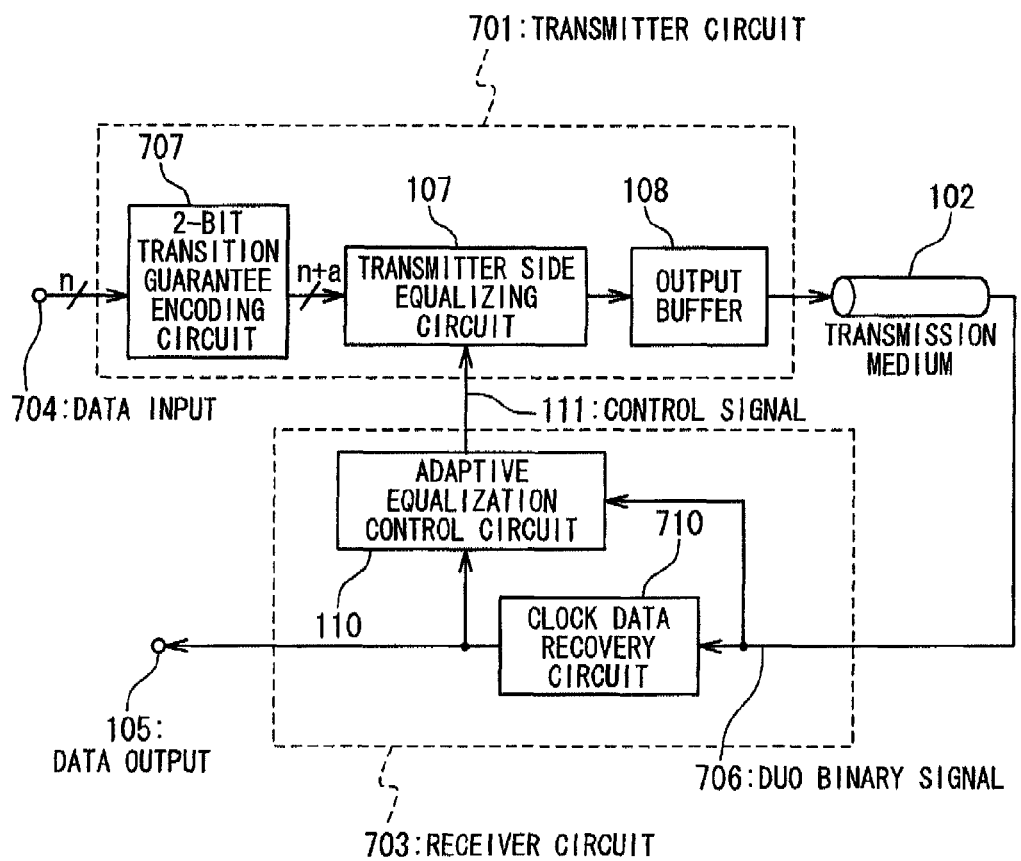
FIG. 12 is a block diagram showing the configuration of the partial response signaling system according to a fifth embodiment of the present invention.
Figure 13:
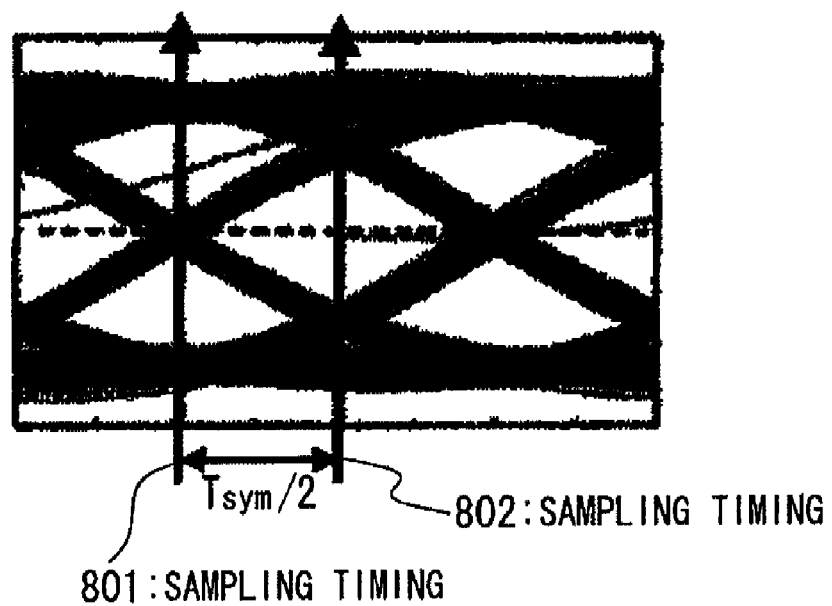
FIG. 13 is a diagram showing the effect of a transition guarantee encoding circuit in the partial response signaling system according to the fifth embodiment of the present invention.

FIG. 12 is a block diagram showing the configuration of the partial response signaling system according to the fifth embodiment of the present invention. FIG. 12 shows a duo-binary signaling system as one kind of partial response transmission, which has a configuration obtained by adding a 2-bit transition guarantee encoding circuit 707 to the partial response signaling system shown in FIG. 6. In the duo-binary signaling, when a symbol-rate signal which includes 010/101 sequence is supplied, clock recovery becomes difficult by the inter-symbol interference. However, when a data sequence (0011/1100) which transits in units of two bits is supplied, the clock can be recovered without any problem. Accordingly, by using the 2-bit transition guarantee encoding circuit 707, a data input 704 is encoded so that an output of the transmitter circuit 701 may contain clock recoverable 2-bit transition. FIG. 13 shows an example of the duo-binary signal and sampling timings 801 and 802 in case where the data sequence which varies in the symbol rate is inhibited. By assuring 2-bit transition, a correct value against a central threshold value can be determined at the sampling timing 802. As a result, the clock data recovery circuit 710 of the receiver circuit 703 can recover a correct clock from the received duo-binary signal 706, thereby an achieving high-speed duo-binary signaling system. Here, given that the input of the 2-bit transition guarantee encoding circuit 707 is n bits, the bit length becomes longer due to coding and the output becomes (n+a) bits (n, a are natural numbers)

Sixth Embodiment

Figure 14:
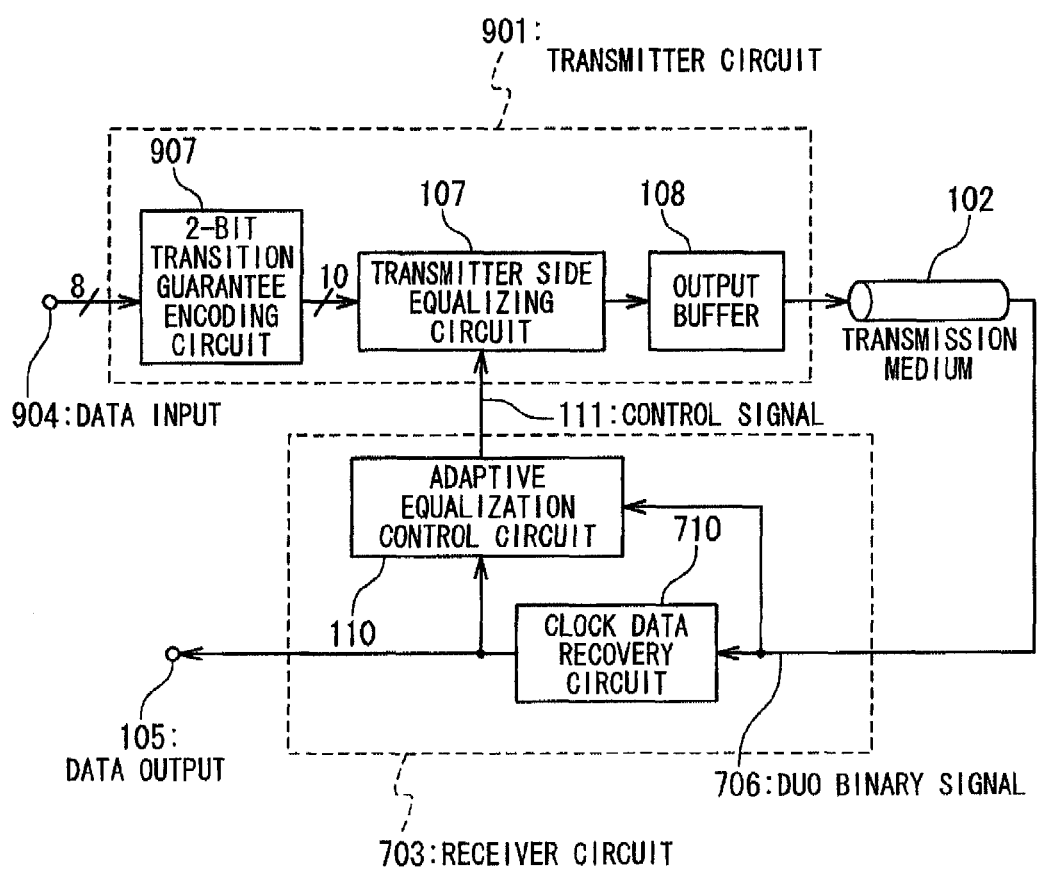
FIG. 14 is a block diagram showing the configuration of the partial response signaling system according to a sixth embodiment of the present invention.

FIG. 14 is a block diagram showing the configuration of the partial response signaling system according to the sixth embodiment of the present invention. FIG. 14 shows a duo-binary signaling system as one kind of partial response signaling, in which a data input 904 of a 2-bit transition guarantee encoding circuit 907 in a transmitter circuit 901 is 8 bits and an output thereof is 10 bits. FIG. 15 shows an example of coding performed by the 2-bit transition guarantee encoding circuit 907. By encoding lower 3 bits of the 8-bit input data to 5 bits, 2-bit transition of 0011 or 1100 is contained in 10-bit output data. Here, x is any value.

Seventh Embodiment

Figure 16:
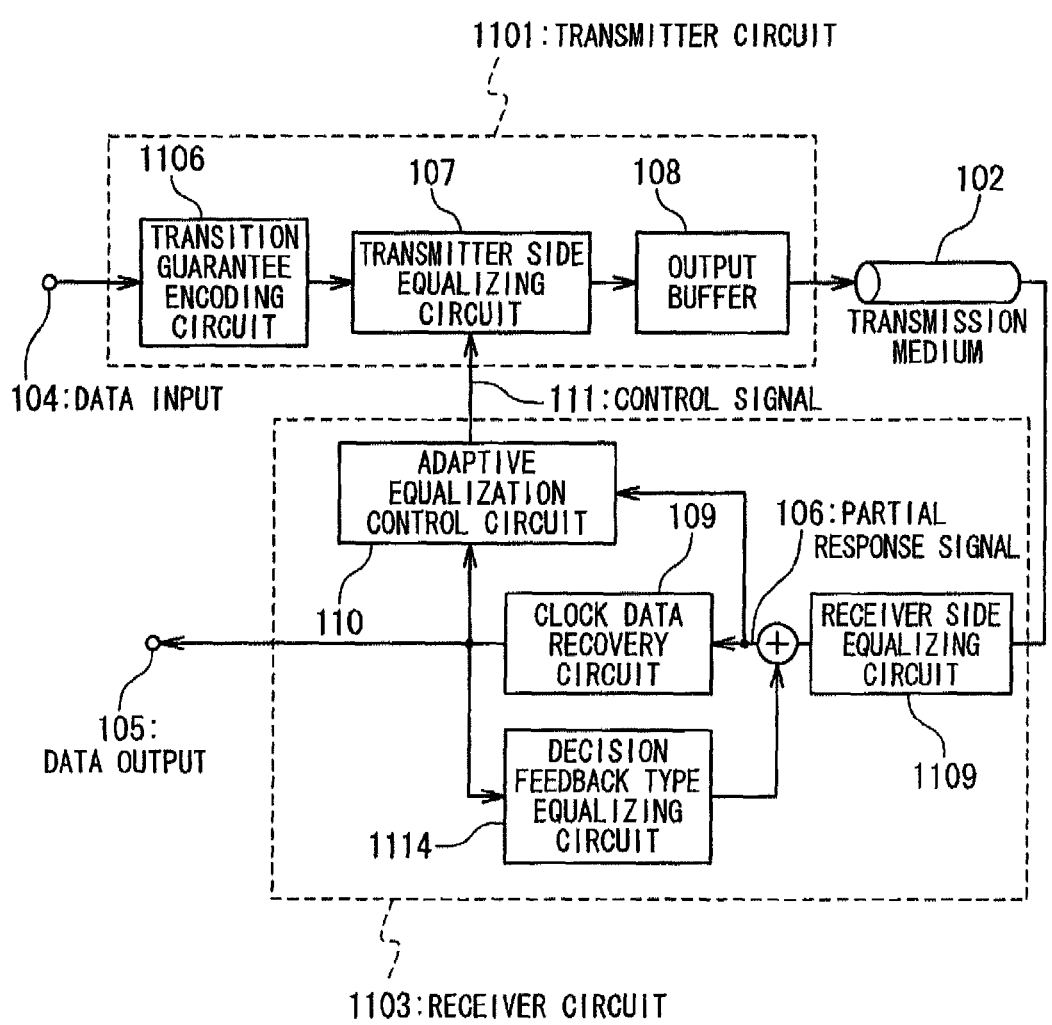
FIG. 16 is a block diagram showing the configuration of the partial response signaling system according to a seventh embodiment of the present invention.

FIG. 16 is a block diagram showing the configuration of the partial response signaling system according to the seventh embodiment of the present invention. FIG. 16 shows a duo-binary signaling system as one kind of partial response signaling, which has the configuration obtained by adding a transition guarantee encoding circuit 1106 to a transmitter circuit 1101 and a receiver side equalizing circuit 1109 and a decision feedback type equalizing circuit 1114 to a receiver circuit 1103 in the partial response signaling system shown in FIG. 6.

Figure 17:
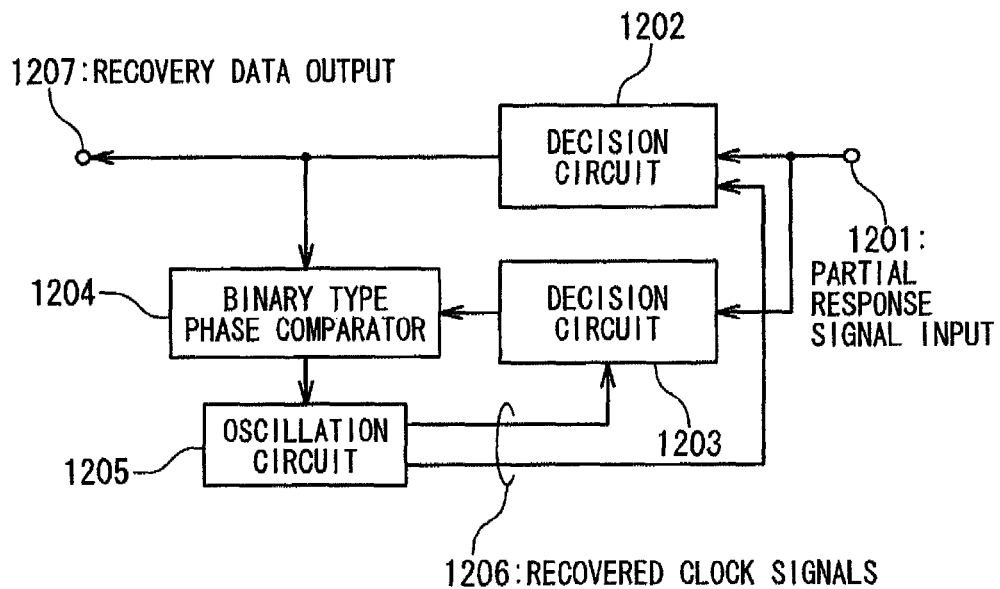
FIG. 17 is a block diagram showing an example of a clock data recovery circuit in the partial response signaling system of the present invention.

FIG. 17 is a block diagram showing an example of a clock data recovery circuit used in the partial response signaling system according to the seventh embodiment of the present invention. A partial response signal input 1201 is decided by decision circuits 1202 and 1203 which respectively operate in response to clocks at different timing. Each decision result is supplied to a binary type phase comparator 1204 and a phase comparison result is output in binary. According to the comparison result, the phase of an oscillation circuit 1205 changes and accordingly, timings of recovered clocks 1206 which drive the decision circuits 1202 and 1203 also changes. Such a feedback loop constituted from the decision circuits 1202 and 1203, the binary type phase comparator 1204 and the oscillation circuit 1205 allows timing of the recovered clock 1206 to be an optimum timing for the partial response signal input 1201. According to the clock of the optimum timing, data decided by the decision circuit 1202 becomes a recovery data output 1207.

Figure 18:
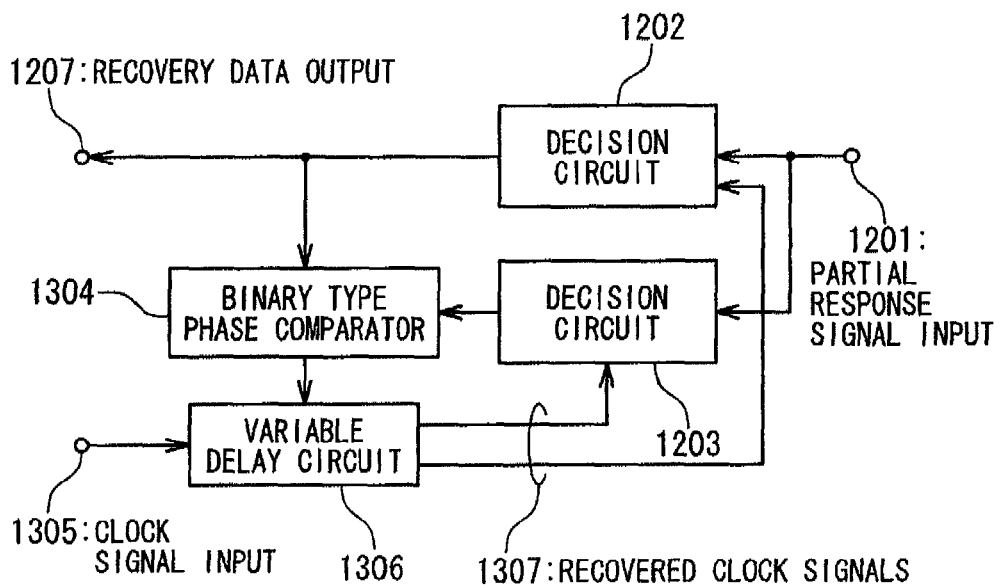
FIG. 18 is a block diagram showing another example of the clock data recovery circuit in the partial response signaling system of the present invention.

FIG. 18 is a block diagram showing another example of a clock data recovery circuit in the partial response signaling system according to the seventh embodiment of the present invention. A clock data recovery circuit in FIG. 18 has the configuration obtained by replacing the oscillation circuit 1205 in the clock data recovery circuit in FIG. 17 with a variable delay circuit 1306 which operates in response to a clock input 1305. In the clock data recovery circuit in FIG. 18, a recovered clock 1307 is obtained by varying delay by the variable delay circuit 1306 on the basis of a phase comparison result by a binary phase comparator 1304.

As described above, in the partial response signaling system of the present invention, a high-speed data signal can be equalized to a partial response signal in waveform without being limited by the operating speed of the receiver side equalizing circuit, typically receiver side FIR filter circuit, which processes multi-bit data. Furthermore, high-speed clock data recovery can be achieved without being limited operating speed of the Mueller-Muller phase comparator and operational problems of the oversampling binary phase comparator.

The invention claimed is:

1. A signaling system comprising:
   a transmitter circuit configured to equalize input data in response to a control signal and to transmit a partial response signal through a transmission medium; and
   a receiver circuit configured to recover an output data from said partial response signal and to generate said control signal based on said partial response signal and an expected signal to output said control signal to said transmitter circuit,
   wherein said transmitter circuit comprises a transmitter side equalizing circuit configured to equalize the input data in response to said control signal,
   wherein said transmitter side equalizing circuit comprises:
   a plurality of stages of delay circuits;
   a plurality of parallel-serial converting circuits configured for receiving data in parallel and for serially outputting the received parallel data, the plurality of parallel-serial converting circuit including at least one parallel-serial converting circuit receiving input data in parallel from two delay circuits from among the plurality of delay circuits, and outputting serial data based on the received parallel data; and
   a plurality of variable output drivers configured for receiving said serial data output from the plurality of parallel-serial converting circuits and configured to output data based on the received serial data and corresponding predetermined weights.

2. The signaling system according to claim 1, wherein:
   the plurality of parallel-serial converting circuits are configured such that every two of the plurality of parallel-serial converting circuits correspond to one of said plurality of stages,
   one of said two parallel-serial converting circuit receives, in parallel, input data of a first delay circuit of a corresponding stage and an output data of a second delay circuit of said corresponding stage and serially outputs the data received in parallel, and
   the other of said two parallel-serial converting circuit receives, in parallel, output data of said first delay circuit of said corresponding stage and output data of said second delay circuit of said corresponding stage and serially outputs the received data.

3. The signaling system according to claim 2, wherein said receiver circuit comprises:
   a clock data recovery circuit configured to recover said output data from said partial response signal; and
   an adaptive equalization control circuit configured to generate said control signal from said partial response signal and said output data.

4. The signaling system according to claim 2, wherein said receiver circuit comprises:
   an adder configured to add a feedback signal to said partial response signal to generate an added partial response signal;
   a clock data recovery circuit configured to recover said output data from the added partial response signal;
   an adaptive equalization control circuit configured to generate said control signal from the added partial response signal and said output data; and
   a decision feedback type equalizing circuit configured to generate said feedback signal from said output data.

5. The signaling system according to claim 2, wherein said receiver circuit comprises:
   a receiver side equalizing circuit configured to equalize said partial response signal to generate an equalized partial response signal;
   a clock data recovery circuit configured to generate said output data from the equalized partial response signal; and
   an adaptive equalization control circuit configured to generate said control signal from said partial response signal and said output data.

6. The signaling system according to claim 1, wherein said transmitter circuit comprises:
   a 2-bit transition guarantee encoding circuit configured to encode the input data of n parallel bits into (n+2)-bit data containing transition in units of 2 bits to generate an input coded data; and
   a transmitter side equalizing circuit configured to equalize the input coded data in response to said control signal, wherein n is a natural number.

7. The signaling system of claim 6, wherein the transmitter side equalizing circuits include a finite impulse response filter, said finite impulse response filter includes the plurality of stages of delay circuits, the plurality of parallel-serial converting circuits, and the plurality of variable output drivers.

8. The signaling system according to claim 1, wherein said transmitter circuit comprises:
   a 2-bit transition guarantee encoding circuit configured to encode the input data of n parallel bits into (n+2)-bit data containing transition in units of 2 bits to generate an input coded data; and a transmitter side equalizing circuit configured to equalize the input coded data in response to said control signal, and wherein said receiver circuit comprises:

a receiver side equalizing circuit configured to equalize said partial response signal to generate an equalized partial response signal;

an adder configured to add a feedback signal to the equalized partial response signal to generate an added partial response signal;

a clock data recovery circuit configured to recover said output data from the added partial response signal;

an adaptive equalization control circuit configured to generate said control signal from the added partial response signal and said output data; and a decision feedback type equalizing circuit configured to generate the feedback signal from said output data, wherein n is a natural number.

9. The signaling system according to claim 8, wherein said clock data recovery circuit comprises:

first and second decision circuits configured to operate in response to first and second recovered clocks and to output decision results of said partial response signal, said first and second recovered clocks having different timings;

a binary type phase comparator configured to compare the decision results from said first and second decision circuits and to recover said output data; and an oscillation circuit configured to output said first and second recovered clocks based on a comparison result by said binary type phase comparator.

10. The signaling system according to claim 8, wherein said clock data recovery circuit comprises:

first and second decision circuits configured to operate in response to first and second recovered clocks and to output decision results of said partial response signal, said first and second recovered clocks having different timings;

a binary type phase comparator configured to compare the decision results to recover said output data; and a variable delay circuit configured to output said first second recovered clocks based on the comparison results by said binary type phase comparator and an input clock.

11. The signaling system according to claim 1, wherein said transmitter circuit comprises:

a 2-bit transition guarantee encoding circuit configured to encode the input data of n parallel bits into (n+2)-bit data containing transition in units of 2 bits to generate an input coded data; and a transmitter side equalizing circuit configured to equalize the input coded data in response to said control signal, wherein said receiver circuit comprises:

a clock data recovery circuit configured to recover said output data from said partial response signal; and an adaptive equalization control circuit configured to generate said control signal from said partial response signal and said output data, and wherein said clock data recovery circuit comprises:

first and second decision circuits configured to operate in response to first and second recovered clocks and to output decision results of said partial response signal, said first and second recovered clocks having different timings;

a binary type phase comparator configured to compare the decision results from said first and second decision circuits and to recover said output data; and an oscillation circuit configured to output said first and second recovered clocks based on a comparison result by said binary type phase comparator, wherein n is a natural number.

12. The signaling system according to claim 1, wherein said transmitter circuit comprises:

a 2-bit transition guarantee encoding circuit configured to encode the input data of n parallel bits into (n+2)-bit data containing transition in units of 2 bits to generate an input coded data; and a transmitter side equalizing circuit configured to equalize the input coded data in response to said control signal, wherein said receiver circuit comprises:

a clock data recovery circuit configured to recover said output data from said partial response signal; and an adaptive equalization control circuit configured to generate said control signal from said partial response signal and said output data, and wherein said clock data recovery circuit comprises:

first and second decision circuits configured to operate in response to first and second recovered clocks and to output decision results of said partial response signal, said first and second recovered clocks having different timings;

a binary type phase comparator configured to compare the decision results to recover said output data; and a variable delay circuit configured to output said first second recovered clocks based on the comparison results by said binary type phase comparator and an input clock, wherein n is a natural number.

* * * * *

UNITED STATES PATENT AND TRADEMARK OFFICE
CERTIFICATE OF CORRECTION

| | | |
|---|---|---|
| PATENT NO. | : 7,839,924 B2 | Page 1 of 1 |
| APPLICATION NO. | : 11/575391 | |
| DATED | : November 23, 2010 | |
| INVENTOR(S) | : Yamaguchi | |

It is certified that error appears in the above-identified patent and that said Letters Patent is hereby corrected as shown below:

Column 1, Line 62: Delete "recovered," and insert -- recovered. --

Column 2, Line 24: Delete "$e_n=d_n-y_n$n adjusting" and insert -- $e_n=d_n-y_n$. An adjusting --

Column 7, Line 50: Delete "first second" and insert -- first and second --

Column 9, Line 6: Delete "108, A" and insert -- 108. A --

Column 12, Line 36: After "numbers)" insert --.--.

Column 15, Line 42-43: In Claim 10, delete "first second" and insert -- first and second --

Column 16, Line 46-47: In Claim 12, delete "first second" and insert -- first and second --

Signed and Sealed this
Tenth Day of May, 2011

David J. Kappos
*Director of the United States Patent and Trademark Office*